(12) United States Patent
LeBlanc

(10) Patent No.: US 6,304,877 B1
(45) Date of Patent: Oct. 16, 2001

(54) DEVICE DESCRIPTION AND MANAGEMENT LANGUAGE FOR COMPUTER NETWORK DEVICES

(75) Inventor: Michael Robert LeBlanc, Shirley, MA (US)

(73) Assignee: 3Com Corporation, Santa Clara, CA (US)

(*) Notice: Subject to any disclaimer, the term of this patent is extended or adjusted under 35 U.S.C. 154(b) by 0 days.

(21) Appl. No.: 09/299,709

(22) Filed: Apr. 26, 1999

(51) Int. Cl.$^7$ ........................................ G06F 17/30
(52) U.S. Cl. ............................ 707/100; 707/200
(58) Field of Search .................... 707/100, 10, 200, 707/203, 205; 364/188, 130; 709/223, 224; 702/188; 700/19; 370/469

(56) References Cited

U.S. PATENT DOCUMENTS

| | | | |
|---|---|---|---|
| 5,796,602 | * 8/1998 | Wellan et al. | 364/130 |
| 5,903,455 | * 5/1999 | Sharpe, Jr. et al. | 364/188 |
| 6,076,952 | * 6/2000 | Gretta et al. | 364/188 |
| 6,088,665 | * 7/2000 | Burns et al. | 702/188 |
| 6,094,600 | * 7/2000 | Sharpe, Jr. et al. | 700/19 |
| 6,108,702 | * 8/2000 | Wood | 709/224 |
| 6,115,393 | * 9/2000 | Engel et al. | 370/469 |
| 6,125,390 | * 9/2000 | Touboul | 709/223 |

* cited by examiner

Primary Examiner—Sanjiv Shah
(74) Attorney, Agent, or Firm—McGlew and Tuttle, P.C.

(57) ABSTRACT

A computer network management software program in a network management device, with a device description language (DDL) file providing an abstraction of features of a network device in a computer network. The DDL file is a human readable text file. A management application monitors and controls a plurality of the network devices on the computer network. The management application includes a configfile parser package for parsing each of the DDL files during executing of the management application to provide information from each of the DDL files to the management application. The management application also includes a hotsystemsnmp package for polling each of the plurality of network devices according to polling features of the respective network devices as determined by the configfile parser package.

12 Claims, 3 Drawing Sheets

FIGURE 3

DeviceInfo.cfg File     // All entries must include SystemInfoPoll

DeviceInfo Begin

{ SysObjectID Device    " device name1"    ".1.3.6.1.4.1.114.2.1.1.1" // Rev. 1.1
    {    SystemCapabilities    {    SoftwareRevision "1.1.0"
                                      {    FILTERS;
                                            PORTGROUPS; }    }

PollProcess
        {    "SystemInfoPoll"    // All entries include SystemInfoPoll
            "ChassisInfoPoll"
            "EthernetPortPoll" //
            "IfStackTablePoll"    // MIB-II feature not always supported
            "InterfaceLocationPoll"
            "BridgeTablePoll"
            "BridgePortTablePoll" }    }

SysObjectID Device " device name 2"    ".1.3.6.1.4.1.43.1.16.1.1.1." Rev. 1.2+

{    SystemCapabilities    {    SoftwareRevision "1.2.0"
                                      {    QOS;
                                            FILTERS;
                                           PORTGROUPS;
                                           CUSTOMFILTERS;    }

SoftwareRevision "2.0.0"
                          {    QOS;
                              FILTERS;
                              PORTGROUPS;
                              ADDRESSGROUPS;
                              CUSTOMFILTERS;    }    }

{    PollProcess
        {    "SystemInfoPoll"    // All entries SystemInfoPoll
            "ChassisInfoPoll"
            "EthernetPortPoll"    //
            "IfStackTablePoll"    // MIB-II feature not always supported
            "InterfaceLocationPoll"
            "BridgeTablePoll"
            "BridgePortTablePoH" }    }    }    END

DEVICE DESCRIPTION AND MANAGEMENT LANGUAGE FOR COMPUTER NETWORK DEVICES

FIELD OF THE INVENTION

The present invention relates to a computer language for monitoring and controlling devices of a computer network, in particular to a device description file and a separate management application.

BACKGROUND OF THE INVENTION

When network management applications are implemented in software, a considerable amount of the device attribute information is typically defined within the source code for each device being managed. When changes are required for a particular device, the source code must be searched, modified, compiled, linked and tested. This process can be time consuming and error prone since a developer must first locate the device attribute information for a device (which may be scattered throughout several thousand lines of source code), make the changes, rebuild the application from sources and then regression test the final product.

Device management applications are typically implemented by describing and manipulating device attributes within the source code for that application. An example of this might be the number of ports of a device or a string representing the name of a module on that device. The technique of hard coding the attributes of a device suffices for small applications that support a small number of devices but it does not scale well for large applications that support many devices and may support many more devices in the future. It also does not scale well as new features are added to a device or firmware. A network management application can grow to be tens of thousands of lines of software. This becomes costly from a maintenance point of view and proves to be time consuming when modifications must be made to a device attribute list or new devices to be managed are added to the system.

It is quite often that string literals are placed within source code. A change to a string literal requires one or more changes to the source code which can be quite tedious for very large applications whose source code is distributed in many libraries. The entire source code control system would have to be scoured for the offending string and the appropriate changes made to correct the application behavior. Furthermore, device attributes such as port count, slot count, software revision functionality is typically hard coded into sources which further increases the maintenance of a software system. In addition to maintenance, the development process is also affected since the application requires building object code, linking and testing the executable.

SUMMARY AND OBJECTS OF THE INVENTION

It is a primary object of the present invention to provide a computer network management application where specific information for the network devices is not stored in the source code of the network application, but in a separate Device Description Language (DDL) file that can be separately created and read when the management application initially executes. The information in the DDL file is preferably static information of the network devices which can not be directly polled from the network device over the network.

This object is accomplished by creating a DDL file providing an abstraction of features of one of the devices of the computer network in a human readable text file. A management application source file is then created for monitoring and controlling the plurality of devices on the network. The management application source file is compiled into a management application executable file without reading information from the DDL file. Execution of the management application executable file includes parsing the DDL file to provide information from the DDL file to the management application. During execution, the management application also polls the one device according to polling features of the device as determined during the parsing of the DDL file.

The information in the DDL file can be abstracted such that many attributes can be described for many network devices. The text file can be parsed, read in by the management application at runtime and the information contained within this text file can be used by the management application at runtime. The grammar of the DDL file uses tokens and attributes to make it both readable to a human and to the management application.

The DDL file has a System Capabilities section describing the physical features of the network devices, which includes such information such as the number and type of filters, portgroups, slotgroups and address groups of the respective network devices. The DDL file also includes a polling process definition section describing the sizing and polling processes supported by the respective network devices. A literal string providing a name of the respective network devices can also be included in the DDL file. A plurality of DDL files can also be provided with each of the plurality of DDL files describing one of the network devices. The network device that is hosting the management application preferably has the DDL file and the management application encoded in memory devices of the network management device.

Each the network device operates using one of a plurality of versions of agent software, and the DDL file includes a plurality of divisions, with each of the division describing features of one of the versions of the agent software. The management application reads agent software version information from the network devices and uses features from a respective division of the DDL file for monitoring and control of the respective network device.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 3 is a sample of a DDL file.

DESCRIPTION OF THE PREFERRED EMBODIMENT

Figure 1:
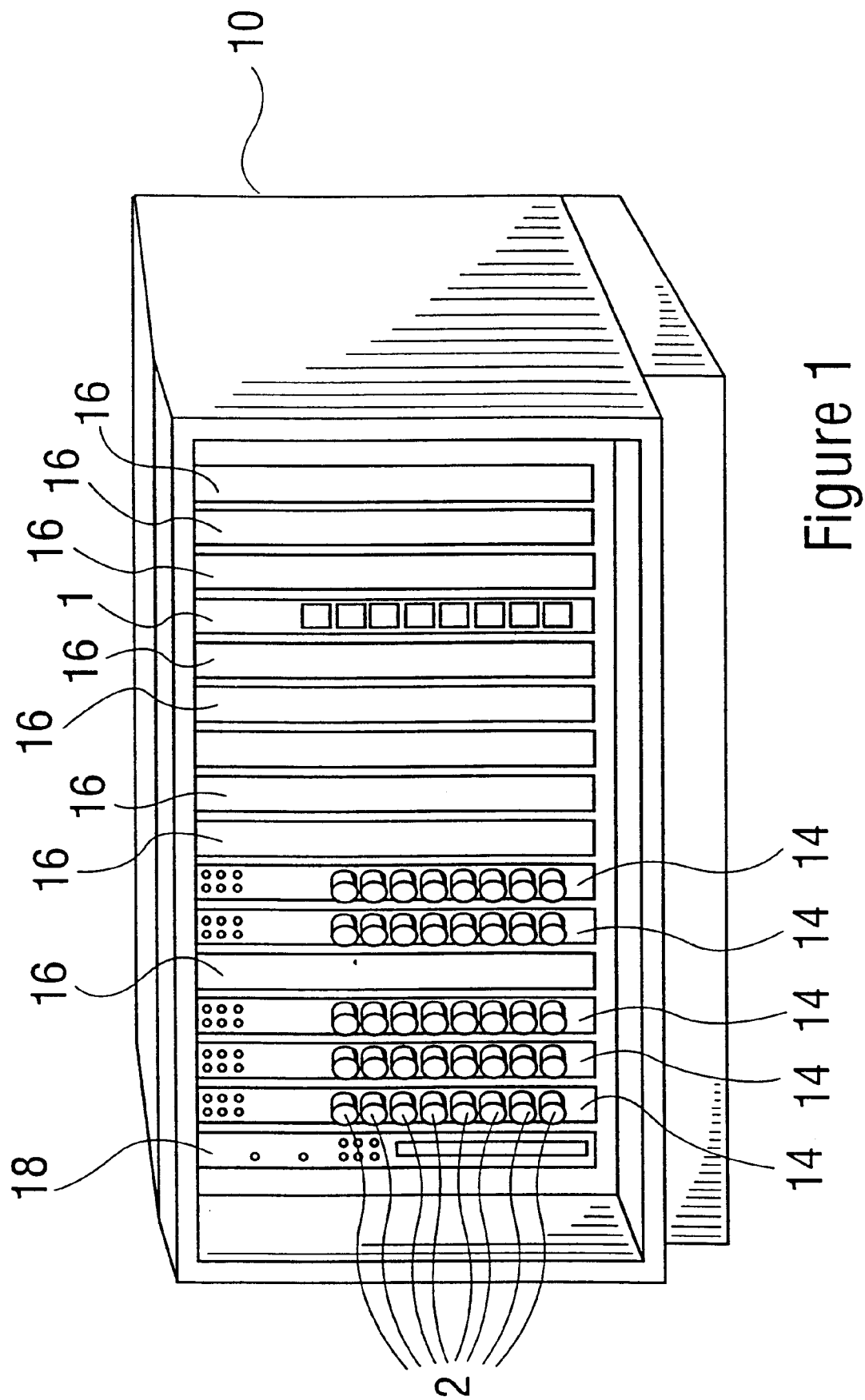
FIG. 1 is a perspective view of a concentrator containing several modules.
Figure 2:
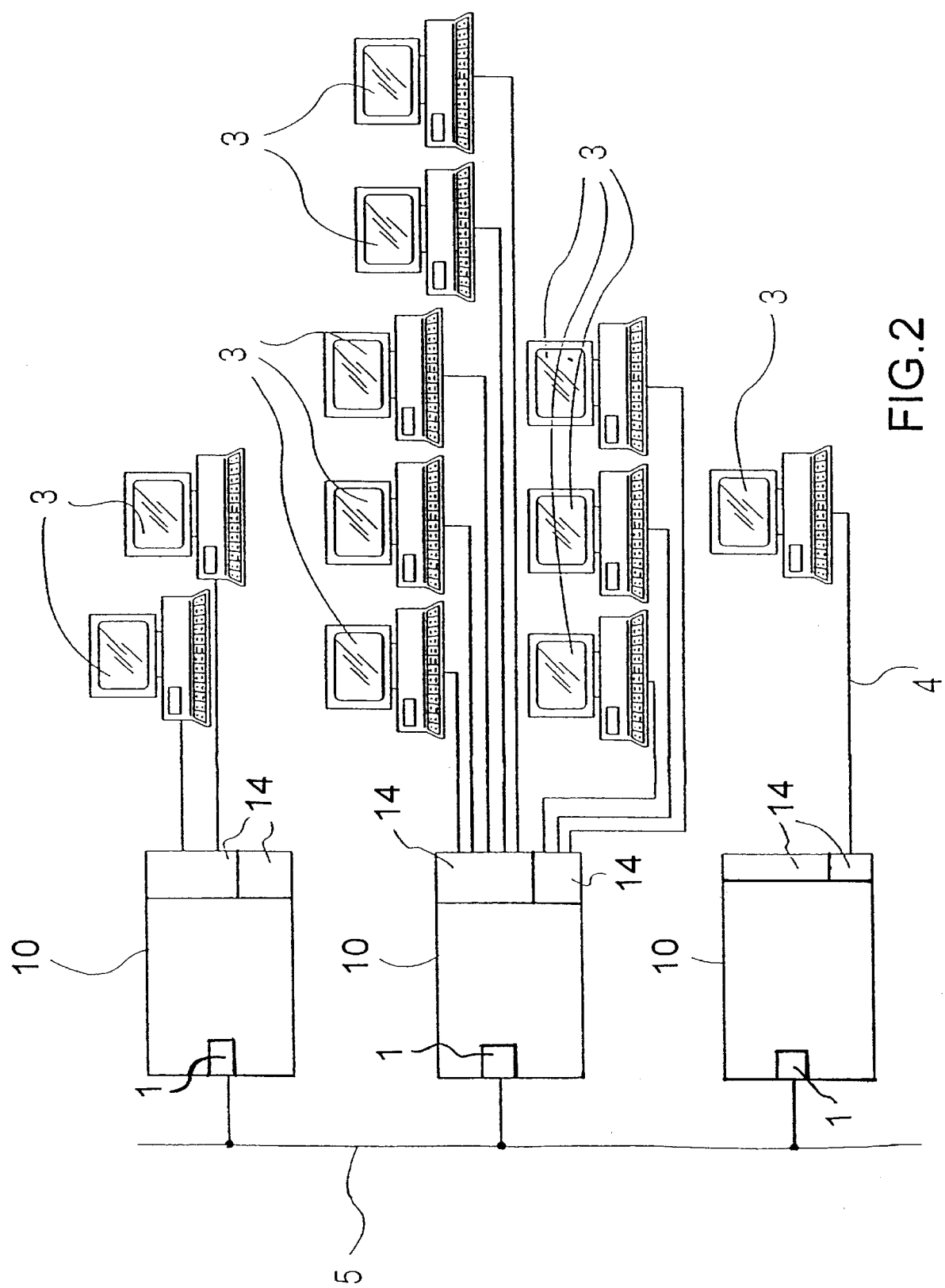
FIG. 2 is a schematic view of several work stations connected to modules of a concentrator.

Referring to the drawings in particular, FIG. 1 shows a network device such as a concentrator 10 which contains a plurality of media modules 14, bridge or router modules 1, concentrator management/power supply modules 18 and a plurality of empty slots 16 which can be filled with modules. Each of the media modules 14 has a plurality of ports 2. As shown in FIG. 2, a plurality of stations 3 can be connected over cables 4 (or by other means) to the ports 2 of media modules 14. The concentrator 10 can be connected to a plurality of other concentrators 10 to serve more users and to provide more than one Local Area Network (LAN). Two or more concentrators 10 can be connected through bridge or router modules 1. Depending on the media modules 14 and the router modules 1, the stations 3 can be combined to form any combination of LAN. In this way, the modules on several different concentrators can be connected to form a single bus network or users from different concentrators can be connected. The concentrators 10 are usually connected by a high bandwidth link 5. The media modules 14, the routers 1, and the concentrator management/power supply modules 18 can be provided with processors that can be configured by a network management application running on a station 3. All of these modules are network devices, and even such devices as network printers and modems can be considered network devices and controlled by a network management application.

By abstracting and describing many of the attributes of a network device in an external human readable text file, the device attributes can be modified with a text editor. The application can then read the device description file at runtime and use the modified attribute information internally. The external description centralizes the device attribute information and allows the changes and additions to be updated before runtime and not at compile time. It also allows for new devices to be easily described and interpreted by the application providing a scalable system.

A sample of a device description language (DDL) file is shown in FIG. 3. The entries in this file are described by a grammar developed for the present invention. The grammar is made up of tokens and attributes. The first token found in the DDL file describes the type of file it is (i.e. the "DeviceInfo" token). The second token, "Begin" and the last token "End" describe the beginning and end of the File. These are required so that the grammar parser can determine when to start and stop reading the device attributes. An actual DDL file is as follows:

Item 2

DeviceInfo.cfg File
// All entries must include the SystemInfoPoll at a minimum
DeviceInfo Begin
{
 SysObjectID Device "CoreBuilder3500R1" ".1.3.6.1.4.1.114.2.1.1.1.1.9"
 // CoreBuilder 3500 Rev. 1.1 (BA)
 {
    SystemCapabilities
    {
      SoftwareRevision "1.1.0"
      {
         FILTERS;
         PORTGROUPS;
      }
    }
    PollProcess
    {
        "SystemInfoPoll" // All entries must include the
        SystemInfoPoll at a minimum
       "ChassisInfoPoll"
       "EthernetPortPoll" //

Item 2 -continued

"IfStackTablePoll" // This is a MIB-II thingy but poll
       it separately since not all systems support it
       "VlanifTablePoll" // This is proprietary
       "InterfaceLocationPoll"
       "BridgeTablePoll"
       "BridgeportTablePoll"
       }
 }
}
SysObjectID Device "CoreBuilder3500R2" ".1.3.6.1.4.1.43.1.16.1.1.1.1"
// CoreBuilder 3500 Rev. 1.2+ (BA)
{
    SystemCapabilities
    {
    SoftwareRevision "1.2.0"
    {
       QOS;
       FILTERS;
       PORTGROUPS;
       CUSTOMFILTERS;
    }
    SoftwareRevision "2.0.0"
    {
    QOS;
    FILTERS;
    PORTGROUPS;
    ADDRESSGROUPS;
    CUSTOMFILTERS;
    }
    }
    PollProcess
    {
        "SystemInfoPoll" // All entries must include the
        SystemInfoPoll at a minimum
       "ChassisInfoPoll"
       "EthernetPortPoll" //
       "IfStackTablePoll" // This is a MIB-II thingy but poll
       it separately since not all systems support it
       "VlanIfTablePoll" // This is proprietary
       "InterfaceLocationPoll"
       "BridgeTablePoll"
       "BridgeportTablePoll"
    }
}
SysObjectID Device "CoreBuilder9400-24" ".1.3.6.1.4.1.43.1.16.1.2.1.1"
// CoreBuilder 9400 24 Port (GA)
{
    SystemCapabilities None
    PollProcess
    {
       "SystemInfoPoll" // All entries must include the
        SystemInfoPoll at a minimum
       "ChassisInfoPoll"
       "EthernetPortPoll" //
    }
}
SysObjectID Device  "SuperStack9300" ".1.3.6.1.4.1.43.1.16.2.2.2.1"
// SuperStack 9300 12 Port (GA)
{
    SystemCapabilities None
    PollProcess
    {
       "SystemInfoPoll" // All entries must include the
       SystemInfoPoll at a minimum
       "ChassisInfoPoll"
       "EthernetPortPoll1"//
       "IfStackTablePoll1" // This is a MIB-II thingy but poll
       it separately since not all systems support it
       "VlanIfTablePoll" // This is proprietary
          "InterfaceLocationPoll"
          "BridgeTablePoll"
          "BridgePortTablePoll"
       }
}
SysObjectID Device "Eclipse" ".1.3.6.1.4.1.43.1.9.13.3.1"
// Eclipse chassis
{
    SystemCapabilities None ---
Item 2
---

```
PollProcess
{
    "SystemInfoPoll" // All entries must include the
    SystemInfoPoll at a minimum
    "EntityPhysicalTable"
    "EntityLogicalTable"
    "EntityLpPhysicalMappingTable"
    "EntityPhysicalContainsTable"
    }
  }
}
End
```

Each device entry and subentries begins with a left curly brace "{" and ends with a right curly brace "}". To fully describe the strength and scalability of this mechanism, one can observe the entry for the "device name 2". The first adornment that should be noted is ".1.3.6.1.4.1.43.1.16.1.1.1.". This adornment is called the system object identifier or system OID. This system OID is a unique identifier for a device. It allows a network management station to discern what type of device it is communicating with. Using this as a key, one can determine what features a device may support. The next adornment of interest is the "SystemCapabilities" token. Within this feature set, the functionality or capabilities of the device are listed depending upon the device software revision (the software revision of a device is typically a management information base (MIB) attribute available through simple network management protocol (SNMP) polling). As more software revisions are added for this device, more "SoftwareRevision" entries can be added to the DDL file listing the new capabilities without any changes to the source code. Also, if descriptions of the device entries need changes, such as "device name 2" changed to "device name 2A", one need only change the description in the appropriate entry.

Another key element of this DDL file is the PollProcess definition section which describes the polling process required to properly size a device (sizing of a device entails polling the device for additional information that is unique to that device and cannot be described statically). By defining a set of predetermined polling processes, the polling process can be defined for many network devices. This again bypasses the requirement of changing source code to modify the applications behavior. Once the changes are made to the corresponding DDL file, the developer merely has to rerun the application under development to access the new information.

In a variation of the present invention is the capability of storing the polled information in a flat file database. Using that invention, one can store the polled data persistently to disk so that it is available after the application is terminated and then restarted.

The present invention provides:
1. A grammar that describes the features and sizing process for network devices;
2. The ability to describe static information in a runtime file, make changes to this runtime file and have the changes immediately available without changing any source code. This provides a reduction in software maintenance costs;
3. A reduction in enhancement addition time by describing device capabilities based upon software revision;
4. The addition of new device types by describing the device using the aforementioned grammar;
5. The polling definition to be defined for each device added to the system;
6. An optional capability of storing the polled data persistently to a database flatfile.

The preferred implementation of this functionality is done using the Java programming language and is stored as the following several packages (a package is the SUN Java equivalent of a software library):
1. ConfigFileParser: Provides parsing of the Device Description Language file;
2. HotSystemSnmp: Provides polling capabilities for the application utilizing the Device Description Language;
3. HotSystemDB: Provides the optional persistent storage of sized device data.

The implementation utilizes the SUN "JJ" language syntax to describe the grammar and it uses the SUN Java Compiler Compiler (JavaCC) kit to generate the Java parsing source used to parse the DDL file. In addition, there are several Java support classes that are used to facilitate the use of the device information as defined in the packages outlined above.

The first step to use the device description feature is to parse the device description file by calling the following lines of code from the "ConfigFileParser" package:
ConfigFileParser deviceInfoparser=new ConfigFileParser ("DeviceInfo.cfg");
deviceInfoParser.startConfigFileParser(), The ConfigFileParser class is responsible for many tasks. One of those tasks is to parse the device description file. As it parses this file, the PollProcess class, a Singleton class (a class that can have at most one instance available to an application), is instantiated and the polling process for each system OID is added to a hashtable. A poll process class file is as follows:

```
PollProcess class File
package com.coms.S2.HotSystemSnmp;
import java.lang.*;
import java.util.*;
/**
 * This class provides a Singleton capability
 * for the Poll Process. Only one (1) of
 * these classes should ever be instantiated.
 * NOTE: Do not subvert this mechanism!!
 */
public class PollProcess extends java.lang.Object
{
    /**
     * This member is a hashtable, keyed by system OIDs,
     * of polling processing steps for each device type.
     * The key is a <code>Stringd</code> containing the
     * system OID and the value is a <code>Vectord</code>
     * containing the processing steps. The items of that
     * Vector are strings describing the class to instanciate.
     */
    private Hashtable m_PollProcessList = new Hashtable();
/**
 * This member holds a static reference to the
 * PollProcess mechanism and is accessed by using
 * the Instance method.
 *
 */
    private static PollProcess m_Instance = null;
    /**
     * Constructor for this class
     */
    protected PollProcess() { }
    /**
     * The Instance() method is used to get a
     * handle to the Singleton PollManager class
```

-continued

```
 * (instead of a constructor)
 */
public static PollProcess Instance()
{
    if(m_Instance == null)
    {
        m_Instance = new PollProcess();
    }
    return m_Instance;
}
/**
 * This method allows the user to add a process
 * to the process list keyed by system OID
 */
public boolean addElement(String oid, Vector process)
{
  Object prevKey = m_PollProcessList.put(oid, process);
  if (prevKey != null)
  {
  return false; // Item was in list previously
  }
  return true; // Item wasn't in list previously
}
/**
 * This method will return the Vector identifying
 * the polling process for a device based upon the
 * device system OID.
 */
private Vector getProcessList(String oid)
{
return (Vector)m_PollprocessList.get(oid);
*/
        for (Enumeration key = m_PollProcessList.keys();
        keys.hasMoreElements();)
        {
        Object object = key.nextElement();
        String listOid = (String)object;
        if(listOid.compareTo(oid) == 0)
        {
         return m_PollProcessList.get(object);
        }
        }
        return false;
        */
}
/**
 * This is a helper function that returns the next step in the polling
 * process. It will return <code>null</code> if there are no further steps.
 * Hand in an empty <code>String</code> for the oid to get the first item
 * in the process.
 */
public String getNextProcess(String oid, String currentProcess)
{
    String nextStep = null;
    if(oid.length() == 0)
    {
        Enumeration e = m_PollProcessList.elements();
        Vector v = (Vector)e.nextElement();
        nextStep = (String)v.elementAt(0);
        return nextStep;
    }
    Vector process = getProcessList(oid);
    if(process != null)
    {
       int currentIndex = process.indexOf(currentProcess);
       int size = process.size();
       if((currentIndex >= 0) && (currentIndex < size-1))
       {
        nextStep = (String)process.elementAt(currentIndex+1);
        return nextstep;
       }
       return nextStep;
    }
}
```

The key of each element in the hashtable is the system OID and the associated value a Vector of strings describing the polling process class. Once the device description file has been parsed and read by the system, all of the information contained within that file is available to the application.

The next step is to access that information using the following code to extract the polling process for a particular system OID. The arguments used would be the system OID (an empty string if unknown; the process mandates that the MIB II information which includes the system OID is a minimal polling process for any device) and the classname of the previous polling process (again and empty string if this is the first process in the polling sequence).

String theNextProcessString=PollProcess.lnstance()
.getNextProcess(theSystemOID, theClassName)

Calling this method would return the next polling process string. This string is then used by the application to instantiate the next polling process object (an object is a memory allocation of a class and a class can be thought of as a folder of information about a particular thing). Other information would be accessed and manipulated in a similar manner. The HotSystemSnmp package utilizes this method to walk through the polling process for each device.

The features described in the specification, drawings, abstract, and claims, can be used individually and in arbitrary combinations for practicing the present invention. While specific embodiments of the invention have been shown and described in detail to illustrate the application of the principles of the invention, it will be understood that the invention may be embodied otherwise without departing from such principles.

What is claimed is:

1. A computer network management software program in a network management device, the program comprising:

a device description language (DDL) file providing an abstraction of features of a network device in a computer network, said DDL file being a human readable text file;

a management application for monitoring and controlling a plurality of the network devices on the computer network, said management application including a configfile parser package for parsing each of said DDL files during executing of said management application to provide information from each of said DDL files to said management application, said management application including a hotsystemsnmp package for polling each of the plurality of network devices according to polling features of the respective network devices as determined by said configfile parser package, said DDL file includes a polling process definition section describing the polling process supported by the respective network device.

2. The program in accordance with claim 1, wherein:

said DDL file includes a system capabilities section describing capabilities of the respective network device.

3. The program in accordance with claim 2, wherein:

said capabilities of said DDL file include a sizing of the respective network device.

4. The program in accordance with claim 2, wherein:

said capabilities of said DDL file include a description of one of filters, portgroups, slotgroups and address groups of the respective network device.

5. The program in accordance with claim 1, wherein:

said DDL file includes tokens and attributes.

6. The program in accordance with claim 1, wherein:

said DDL file includes a literal string providing a name of the respective network device.

7. The program in accordance with claim 1, wherein:
said DDL file includes static information of the respective network device.

8. The program in accordance with claim 1, wherein:
said configfile parser package parses said DDL file during initial execution of said management application.

9. A computer network management software program in a network management device, the program comprising:
- a device description language (DDL) file providing an abstraction of features of a network device in a computer network, said DDL file being a human readable text file;
- a management application for monitoring and controlling a plurality of the network devices on the computer network, said management application including a configfile parser package for parsing each of said DDL files during executing of said management application to provide information from each of said DDL files to said management application, said management application including a hotsystemsnmp package for polling each of the plurality of network devices according to polling features of the respective network devices as determined by said configfile parser package, wherein:
  - each said network device operates using one of a plurality of versions of agent software;
  - said DDL file includes a plurality of divisions, each said division describing features of one of said versions of said agent software; and
  - said management application reads agent software version information from the network devices and uses features from a respective said division of said DDL file for monitoring and control of the respective network device.

10. The program in accordance with claim 1, wherein:
a plurality of DDL files are provide, each of said plurality of DDL files describes one of the network devices.

11. The program in accordance with claim 1, wherein:
said DDL file and said management application are encoded in memory devices of the network management device.

12. A method for managing a plurality of devices of a computer network, the method comprising:
- creating a device description language (DDL) file providing an abstraction of features of one of the devices of the computer network in a human readable text file;
- creating a management application source file for monitoring and controlling the plurality of devices on the network;
- compiling sad management application source file into a management application executable file without reading information from said DDL file;
- executing said management application executable file, said executing including parsing said DDL file to provide information from said DDL file to said management application, said executing also including polling the one device according to polling features of the device as determined during said parsing of said DDL file, wherein said DDL file includes a polling process definition section describing the polling processes supported by the respective network device.

* * * * *